June 3, 1930.                    L. JAENICHEN                    1,761,210
                                 COUNTING SCALE
                                Filed July 8, 1926

Inventor
Louis Jaenichen
By Francis D. Hardesty
Attorney

Patented June 3, 1930

1,761,210

UNITED STATES PATENT OFFICE

LOUIS JAENICHEN, OF SPRINGFIELD TOWNSHIP, OAKLAND COUNTY, MICHIGAN, ASSIGNOR TO THE STANDARD COMPUTING SCALE COMPANY, OF DETROIT, MICHIGAN, A CORPORATION OF MICHIGAN

COUNTING SCALE

Application filed July 8, 1926. Serial No. 121,121.

The present invention relates to counting machines of the scale type adapted to determine the number of units in bulk stocks by comparison of the weight of a single unit with the weight of the larger quantity.

Among the objects of the invention is a direct reading scale by which the operator can read the number of units without reference to tables or calculations.

Another object is a device of the kind mentioned which shall be simple in construction and operation and which requires no change of parts or adjustment to take care of different kinds or sizes of articles to be counted.

With these and other objects in view, as will more clearly hereinafter appear, the device consists broadly in a scale having a system of scale beams in series and having a pan at one end of the series for the unknown quantity with weight pans on the individual levers constructed and arranged to cause each pan to balance a predetermined number of units in the first pan.

Figure 1:
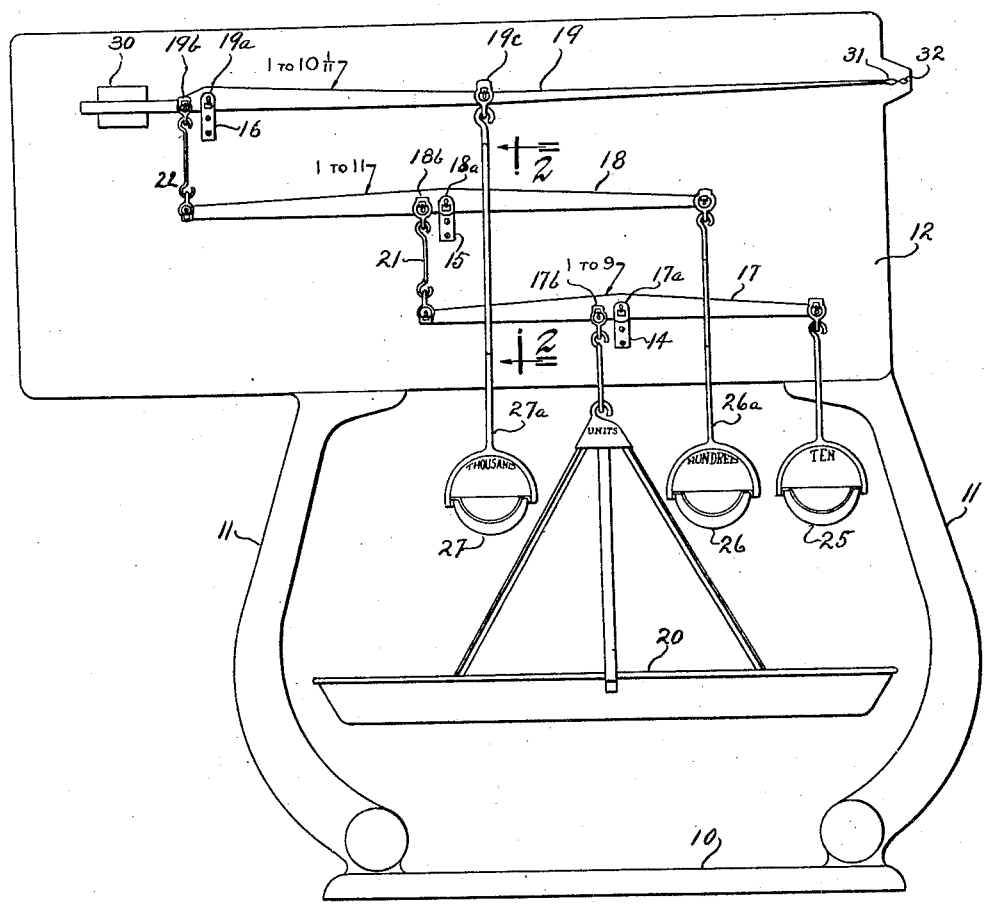
Figure 2:
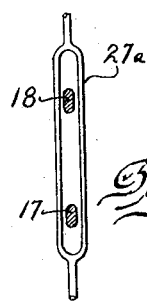

In the drawings, Fig. 1 is a view in elevation of the machine. Fig. 2 is a detail view taken on line 2—2 of Fig. 1.

As indicated, the machine consists of a base 10 having upstanding arms 11 supporting a plate 12 to which are secured a plurality of knife edge bearing supports 14, 15 and 16 which preferably extend outwardly from the plate so as to permit the levers 17, 18 and 19 to move freely thereon.

Levers 17, 18 and 19 are mounted on said bearing supports on suitable knife edge bearings $17^a$, $18^a$, and $19^a$ and are connected in series. The lower lever 17 carries suspended from it on a suitable knife edge bearing $17^b$ near bearing $17^a$ a scale pan 20 in which is to be placed the lot of articles to be counted. Lever 17 also carries suspended at one end a small weight pan 25. The other end of lever 17 is connected through link 21 to lever 18 at bearing $18^b$ near the bearing $18^a$.

Lever 18 carries at one end a small weight pan 26 while its other end is connected through a link 22 to lever 19 at bearing $19^b$ near the bearing $19^a$. Lever 19 has suspended from it near its middle point a small weight pan 27 and on its other end is provided with an adjustable balancing weight 30. The free end of lever 19 beyond the bearing $19^c$ for pan 27 tapers to a pointer 31 cooperating with a marker 32 for balancing purposes.

As the several levers are adapted to be located in the same plane, the pans 26 and 27 are preferably suspended on links $26^a$ and $27^a$ which are in the form of yokes as indicated in Fig. 2.

As indicated in the drawing, the several levers are so constructed and arranged that a single unit in each of the weight pans will balance a predetermined number in the scale pan 20, the preferred arrangement being that one unit in pan 25 balances nine units in the pan 20; one unit in pan 26 balances ninety-nine in pan 20; and one unit in pan 27 balances nine hundred and ninety-nine in pan 20. This is provided for constructing the levers as follows: The lever 17 has its bearing $17^a$ in the middle with the bearing $17^b$ for the scale pan 20 so located that the arm from $17^a$ to $17^b$ is 1/9 of the arm of lever 17 from $17^a$ to the bearing for pan 25. The lever 18 also has its supporting bearing $18^a$ in the middle with bearing $18^b$ so located that the weight arm from $18^b$ to $18^a$ will be 1/11 of the arm from $18^a$ to the bearing for weight pan 26. The lever 19 will have its supporting bearing $19^a$ near one end but will be balanced by the weight 30 and the arm from bearing $19^a$ to bearing $19^c$ will be 10 1/11 times the length of the arm from $19^a$ to $19^b$.

With the levers proportioned and mounted as indicated, single units in the pans 25, 26 and 27 will balance in pan 20 the numbers of units above stated.

In using the device to count the units in an unknown quantity, the latter is placed in pan 20 and a sufficient number transferred to the several pans 25, 26 and 27 to exactly balance the device. When this is done the number of units in pan 27 indicates the thousands; the number in pan 26, the hundreds; and the number in pan 25, the tens; with any odd ones not used in balancing, indicating the single units.

*Example I.*—With a quantity on pan 20, a number are removed and it is found that two in pan 27, one in pan 26 and 4 in pan 25 exactly balance the device with three units not used. The total number is therefore two thousand, one hundred, and forty-three (2143).

*Example II.*—It is desired to count say 1632 units from a stock. In this case, one unit is placed in pan 27, six units in pan 26, and three units in pan 25. Other units are then placed on pan 20 until the scale balances. There are then 1630 units in the several pans and these with two extra constitute the desired number.

Having now described the invention and the preferred form of embodiment thereof it is to be understood that the said invention is not to be limited to the specific details herein set forth but only by the scope of the claims which follow.

I claim:—

1. A counting scale consisting of a scale pan supported by a plurality of levers in series relation, each of said levers having a free arm carrying a weight pan, the weighing arms of each being so proportioned that a single unit in one of said weight pans will balance a predetermined number of units in said scale pan.

2. A counting scale consisting of a support, a plurality of levers mounted on said support and arranged in series, a scale pan supported by the lever at one end of the series, said lever having one free end supporting a weight pan and having its other end supported by a second lever in the series, a weight pan on a free end of said second lever, the other end of said second lever being supported by a third lever and similar connections, levers, and weight pans to the end of the series.

3. In a counting scale, a support having bearings thereon, a plurality of weighing levers mounted on said bearings, and arranged in vertical series relation, a scale pan supported by the lowest lever upon a bearing intermediate the lever bearing and one end of the lever and spaced from said lever bearing a distance equal to one ninth of the distance from the lever bearing to either end of the lever, a weight pan carried at the end of said lever furthest from said scale pan bearing, a link supporting the other end of said lever and suspended from a second lever near its bearing, the point of suspension being spaced from the second lever bearing a distance equal to one eleventh of the distance from said second lever bearing to either end of said second lever, a weight pan carried at the end of said second lever furthest from said link and a second link supporting the other end of said second lever and suspended from a third lever near its supporting bearing, a weight pan carried by said third lever at a point on the other side of the supporting bearing from said second link and at a distance from the supporting bearing equal to ten and one eleventh times the distance from said supporting bearing to said link, and an adjustable weight on said third lever adapted to balance the levers and pans when empty.

4. In a counting scale, a scale pan a series of three levers supporting same, each of said levers carrying a weight pan, said levers and pans being constructed and arranged so that one of said weight pans with a single unit will balance said scale pans with nine units, and another of said weight pans with a single unit will balance said scale pan with ninety-nine units, and the third weight pan will balance said scale pan with nine hundred and ninety-nine units, all of said pans being capable of being balanced simultaneously by a suitable total number of units in the pans.

5. In a counting scale, a support having bearings thereon, a plurality of weighing levers mounted on said bearings, and arranged in vertical series relation, a scale pan supported by the lowest lever upon a bearing intermediate the lever bearing and one end of the lever and spaced from said lever bearing a distance equal to one ninth of the distance from the lever bearing to either end of the lever, a weight pan carried at the end of said lever furthest from said scale pan bearing, means supporting the other end of said lever and suspended from a second lever near its bearing, the point of suspension being spaced from the second lever bearing a distance equal to one eleventh of the distance from said second lever bearing to either end of said second lever, a weight pan carried at the end of said second lever furthest from said link and a second link supporting the other end of said second lever and suspended from a third lever near its supporting bearing, a weight pan carried by said third lever at a point on the other side of the supporting bearing from said second link and at a distance from the supporting bearing equal to ten and one eleventh times the distance from said supporting bearing to said link.

LOUIS JAENICHEN.